UNITED STATES PATENT OFFICE.

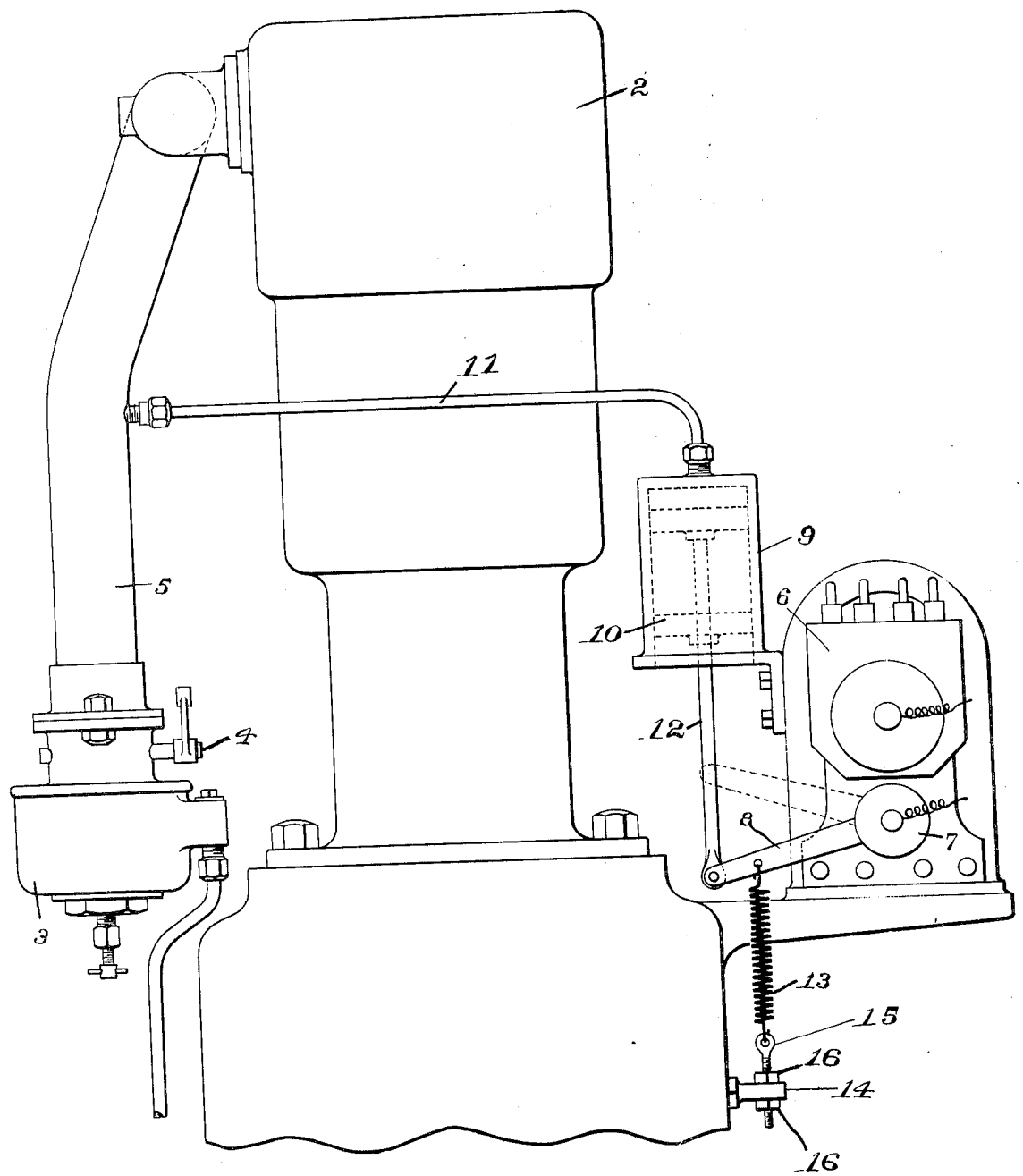

WILLIAM E. NICKERSON, OF CAMBRIDGE, MASSACHUSETTS, ASSIGNOR TO EVERETT D. CHADWICK, TRUSTEE, OF WINCHESTER, MASSACHUSETTS.

IGNITION-TIMING DEVICE FOR INTERNAL-COMBUSTION MOTORS.

1,139,707.  Specification of Letters Patent.  Patented May 18, 1915.

Application filed May 1, 1913. Serial No. 764,805.

*To all whom it may concern:*

Be it known that I, WILLIAM E. NICKERSON, a citizen of the United States, residing at Cambridge, in the county of Middlesex and State of Massachusetts, have invented new and useful Improvements in Ignition-Timing Devices for Internal-Combustion Motors, of which the following is a specification.

This invention relates to the timing of the ignition of the explosive mixture in the cylinders of internal combustion motors, and is particularly applicable to motors such as are used in automobiles, which have to be sufficiently flexible in operation to accommodate themselves to wide variations in speed and load. It is well understood that if such a motor is to operate with its full efficiency the ignition should be timed according to the speed and power demand at any given instant, and heretofore the timing of the ignition has commonly been regulated by hand, according to the judgment of the operator. This is unsatisfactory, however, not only because it is very difficult to secure more than a rough approximation to the best results by manual regulation of the ignition, but also because variations in speed or power demand often occur with such frequency and rapidity that no attempt is made to time the ignition in accordance with them, and my invention is intended to overcome these difficulties by providing for the automatic timing of the ignition by the operation of the motor itself, thus entirely relieving the operator from the necessity of attending to the matter. This object is accomplished, according to my invention, by utilizing the intake suction of the motor to regulate the timing of the ignition in such manner that the ignition is advanced as the suction increases and retarded as the suction decreases, whereby, as will presently appear, any change in speed or power demand results in adjusting the ignition in substantial accordance with theoretical requirements.

While my invention may be utilized in connection with various types of motors and ignition devices it will be explained herein as applied to a multi-cylinder gasolene motor with electric spark ignition controlled by an adjustable timing device, this being the prevalent type of automobile motor.

A simple embodiment of my invention, as preferably constructed, is illustrated by way of example in the accompanying drawing, in which the figure represents such parts of the motor as are sufficient for explaining the invention, with the automatic ignition control applied thereto.

In the drawings, 2 indicates the cylinder casing of the motor, which is assumed to have several cylinders, 3 is the carbureter which supplies the combustible mixture to all the cylinders, 4 is the throttle which controls the supply of mixture, 5 is the intake manifold leading from the carbureter to the several cylinders, 6 is the spark generator, shown as a magneto of familiar construction, and 7 is the timer carried by the magneto 6 and having an operating arm 8. All of the foregoing parts may be of any usual or suitable construction and are combined in the usual way, it being assumed herein that the arrangement is such that the ignition is advanced by an upward movement of the arm 8 and retarded by a downward movement of said arm.

To the parts above mentioned is added a suction-operated device preferably consisting of a small cylinder 9 containing a piston 10 and connected behind the piston to a pipe 11 leading to the manifold between the throttle 4 and the point where the manifold divides on its way to the several cylinders. The cylinder 9 is open to the air in front of its piston 10 and the latter is connected by a piston rod 12 to the operating arm 8, so that suction exerted behind the piston 10 will cause said arm 8 to move in the direction which advances the ignition. This movement is opposed by suitable means such as a spring 13 attached at one end to the arm 8 and at its other end to a fixed support 14, so that it serves to move said arm 8 in the direction which retards the ignition whenever such movement is permitted. The spring 13 is so calibrated that the maximum suction developed in the cylinder 9 will suffice to move the arm 8 against the force of said spring until the ignition is fully advanced, while when no suction is exerted in the cylinder 9 said spring will hold the arm 8 into position to retard the ignition to the maximum extent permitted, the limits of movement of said arm being preferably defined by suitable stops provided either in the timer itself or in the coöperating parts above described, as for example, by the ends of the cylinder 9. The position of the arm 8 between its limits of movement will depend upon the amount of suction exerted in the cylinder 9 at any given instant, except that the spring 13 may be given such a tension, if desired, as to prevent any movement of said arm 8 when the suction is feeble, for the purpose hereinafter explained. Preferably the tension of said spring is made capable of adjustment by suitable means such as a threaded rod 15 passing through a fixed support 14 and provided with adjusting nuts 16, the lower end of the spring being attached to the upper end of this rod 15.

Bearing in mind the well known facts that an increase in the quantity of explosive mixture admitted to the cylinders per stroke will result in increasing the compression pressure of the charge and its temperature due to compression, as well as its purity, that an increase in any or all of the characteristics just mentioned will increase the rapidity of combustion of the mixture and therefore require the ignition to be retarded, the speed remaining the same, and that with a given charge of mixture the ignition should be advanced as the speed increases on account of the resulting diminution of the time available for combustion, a consideration of the manner in which the intake suction is varied by a change in the speed of the motor or of the power demand upon it will show that under all conditions the ignition will be properly regulated by the automatic operation of the arrangement above described. Thus, assuming that the motor is to be kept running at a given constant speed and that an increase in power is demanded, as in driving an automobile up hill, for example, the throttle opening must be increased in order to admit to the cylinders a greater quantity of explosive mixture per stroke, with the result that the rate of combustion of the mixture will be increased and the ignition should therefore be correspondingly retarded. But the wider opening of the throttle will also have the effect of diminishing the suction in the manifold, since there will be less resistance to the flow of the mixture past the throttle, and therefore the required retardation of the ignition will be automatically effected by the operation of the spring 13 acting in opposition to the diminished intake suction. Conversely, if the power demand is reduced and the throttle is closed accordingly, the speed remaining the same, the quantity of mixture supplied to the cylinders per stroke will be reduced, as will its rate of combustion, and the required advancing of the ignition under such conditions will be automatically secured by the increase in the intake suction produced by the closing of the throttle. If the speed varies while the throttle opening remains unchanged any increase in speed will be accompanied by a corresponding advancing of the ignition due to the increased intake suction resulting from the increase in speed, and, conversely, a decrease in speed will result in retarding the ignition on account of the diminished intake suction. When both the speed and the power demand vary simultaneously, the variation of each will have a corresponding effect on the intake suction and the proper timing of the ignition will be automatically secured by the compounded effects of these variations, it being understood of course that the tendency of the suction to increase with an increase in speed may be neutralized in actual operation by a wider opening of the throttle, so that no change in the timing of the ignition will be required or effected. Because of its capacity to respond to a change in speed independently of a change in power demand, and vice versa, my arrangement will serve to automatically regulate the ignition if the motor is so governed as to run at a constant speed, in which case the timing of the ignition will be regulated in accordance with the load only, and, conversely, my arrangement may be utilized in a motor in which the opening through which the mixture is admitted remains unchanged, in which case the ignition will be timed in accordance with the speed only.

When the motor is at rest there will be no suction in the manifold and the spring 13 will therefore move the arm 8 into position to retard the ignition to the maximum extent, which is the proper position of the parts when the motor is to be started. Whenever the motor is running free, with the throttle practically closed, the maximum suction will be developed in the manifold and the ignition will be fully advanced thereby, which is as it should be, while when the motor is subjected to a heavy load and is running at a slow speed the throttle will necessarily be opened wide and the minimum suction will be developed in the manifold, with the result that the ignition will be fully retarded, all of which positions of the ignition correspond to actual working requirements as is well understood.

The piston 10 is preferably made to fit the cylinder 9 with sufficient looseness to provide for the lateral play made necessary by attaching the piston rod 12 directly to the arm 8, as in the construction illustrated, the slight amount of leakage past the piston which is thus permitted being unimportant so long as it is not sufficient to detrimentally affect the proportioning of the mixture, and if desired the leakage provided for in this manner or in any other suitable manner may be utilized to prevent the ignition from being advanced until a certain predetermined amount of suction has been established in the manifold. In this way any danger of advancing the ignition during the cranking of the motor may be avoided. To the same end the spring 13 may be put under an initial tension by suitably adjusting the nuts 16 or otherwise, or the adjustment of this spring may be serviceable in regulating the apparatus for use with different types of carbureters and motors.

While at a given speed the intake suction of a motor of the character above referred to is determined primarily by the position of the throttle, it may be noted that many carbureters contain one or more spring valves through which the main air supply must pass, and since the resistance offered by such a valve to the admission of air becomes more and more effective as the throttle is opened, the suction in the manifold will be greater in such cases than it would be if it were dependent upon the throttle opening and the speed only. The effect of this is rather an advantage than otherwise, since it tends to cause the ignition to be advanced rather than retarded, the practical result being that the ignition is advanced as far as is consistent with the proper operation of the motor.

It is to be understood that any other suitable form of suction-operated device may be employed instead of the cylinder and piston arrangement above described, if preferred, and that the suction-operated device may be combined with various kinds of igniting and timing devices in various ways without departing from my invention, which is broadly characterized by the automatic timing of the ignition in accordance with the intake suction of the motor.

I claim:

1. In an internal combustion motor having a cylinder and an intake passage leading thereto, the combination with means for igniting the explosive mixture in the cylinder of means controlled by the intake suction for timing the ignition.

2. In an internal combustion motor having a cylinder and an intake passage leading thereto, the combination with means for igniting the explosive mixture in the cylinder of means controlled by the intake suction for advancing the ignition as the suction increases and retarding the ignition as the suction diminishes.

3. In an internal combustion motor having a cylinder and an intake passage leading thereto, the combination with means for igniting the explosive mixture in the cylinder of a suction-operated device subjected to the intake suction and movable thereby in one direction, means for moving said device in the opposite direction, and means operated by said device for timing the ignition.

4. In an internal combustion motor having a cylinder and an intake passage leading thereto, the combination with means for igniting the explosive mixture in the cylinder of a supplementary cylinder containing a piston and provided with a passage connecting it to said intake passage, means tending to move said piston in opposition to the suction developed in the supplementary cylinder, and means operated by said piston for timing the ignition.

5. In an internal combustion motor having a cylinder and an intake passage leading thereto, the combination with an ignition device and a timer therefor of a supplementary cylinder containing a piston and provided with a passage connecting it to the intake passage of the motor, connections between said piston and the timer for moving the latter in one direction, and a spring for moving said timer in the opposite direction.

In testimony whereof, I have hereunto subscribed my name this 28th day of April, 1913.

WILLIAM E. NICKERSON.

Witnesses:
 E. D. CHADWICK,
 JOSEPH T. BRENNAN.

Copies of this patent may be obtained for five cents each, by addressing the "Commissioner of Patents, Washington, D. C."